(12) United States Patent
Jaiswal et al.

(10) Patent No.: US 8,050,930 B2
(45) Date of Patent: Nov. 1, 2011

(54) TELEPHONE VOICE COMMAND ENABLED COMPUTER ADMINISTRATION METHOD AND SYSTEM

(75) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 12/113,233

(22) Filed: May 1, 2008

(65) Prior Publication Data

US 2009/0276223 A1 Nov. 5, 2009

(51) Int. Cl.
*G10L 21/00* (2006.01)

(52) U.S. Cl. ............... 704/275; 704/270; 704/270.1; 713/182; 713/183; 726/4; 726/6; 726/17

(58) Field of Classification Search .......... 704/270, 704/275; 713/182, 183; 726/4, 6, 17; 709/217, 709/223, 230
See application file for complete search history.

(56) References Cited

U.S. PATENT DOCUMENTS

| | | | | |
|---|---|---|---|---|
| 5,745,692 A * | 4/1998 | Lohmann et al. | ............ | 709/223 |
| 6,381,631 B1 * | 4/2002 | van Hoff | ............ | 709/202 |
| 6,662,220 B1 * | 12/2003 | Meyer | ............ | 709/223 |
| 6,700,955 B1 * | 3/2004 | Davis et al. | ............ | 379/90.01 |
| 6,940,820 B2 | 9/2005 | Fang | | |
| 7,149,694 B1 * | 12/2006 | Harb et al. | ............ | 704/270.1 |
| 7,194,069 B1 * | 3/2007 | Jones et al. | ............ | 379/88.02 |
| 7,620,707 B1 * | 11/2009 | Sutherland et al. | ............ | 709/223 |
| 7,730,111 B2 * | 6/2010 | DeAnna et al. | ............ | 707/803 |
| 2002/0169615 A1 * | 11/2002 | Kruger et al. | ............ | 704/270.1 |
| 2002/0191754 A1 * | 12/2002 | Liu et al. | ............ | 379/88.01 |
| 2003/0135592 A1 | 7/2003 | Vetter et al. | | |
| 2004/0101122 A1 * | 5/2004 | Da Palma et al. | ............ | 379/219 |
| 2005/0071164 A1 * | 3/2005 | Mandalia et al. | ............ | 704/270.1 |

\* cited by examiner

*Primary Examiner* — James S. Wozniak
*Assistant Examiner* — Jialong He
(74) *Attorney, Agent, or Firm* — Schmeiser, Olsen & Watts; John R. Pivnichny

(57) ABSTRACT

An administration method and system. The method includes receiving by a computing system, a telephone call from an administrator. The computing system presents an audible menu associated with a plurality of computers to the administrator. The computing system receives from the administrator, an audible selection for a computer from the audible menu. The computing system receives from the administrator, an audible verbal command for performing a maintenance operation on the computer. The computing system executes the maintenance operation on the computer. The computing system receives from the computer, confirmation data indicating that the maintenance operation has been completed. The computing system converts the confirmation data into an audible verbal message. The computing system transmits the second audible verbal message to the administrator.

18 Claims, 5 Drawing Sheets

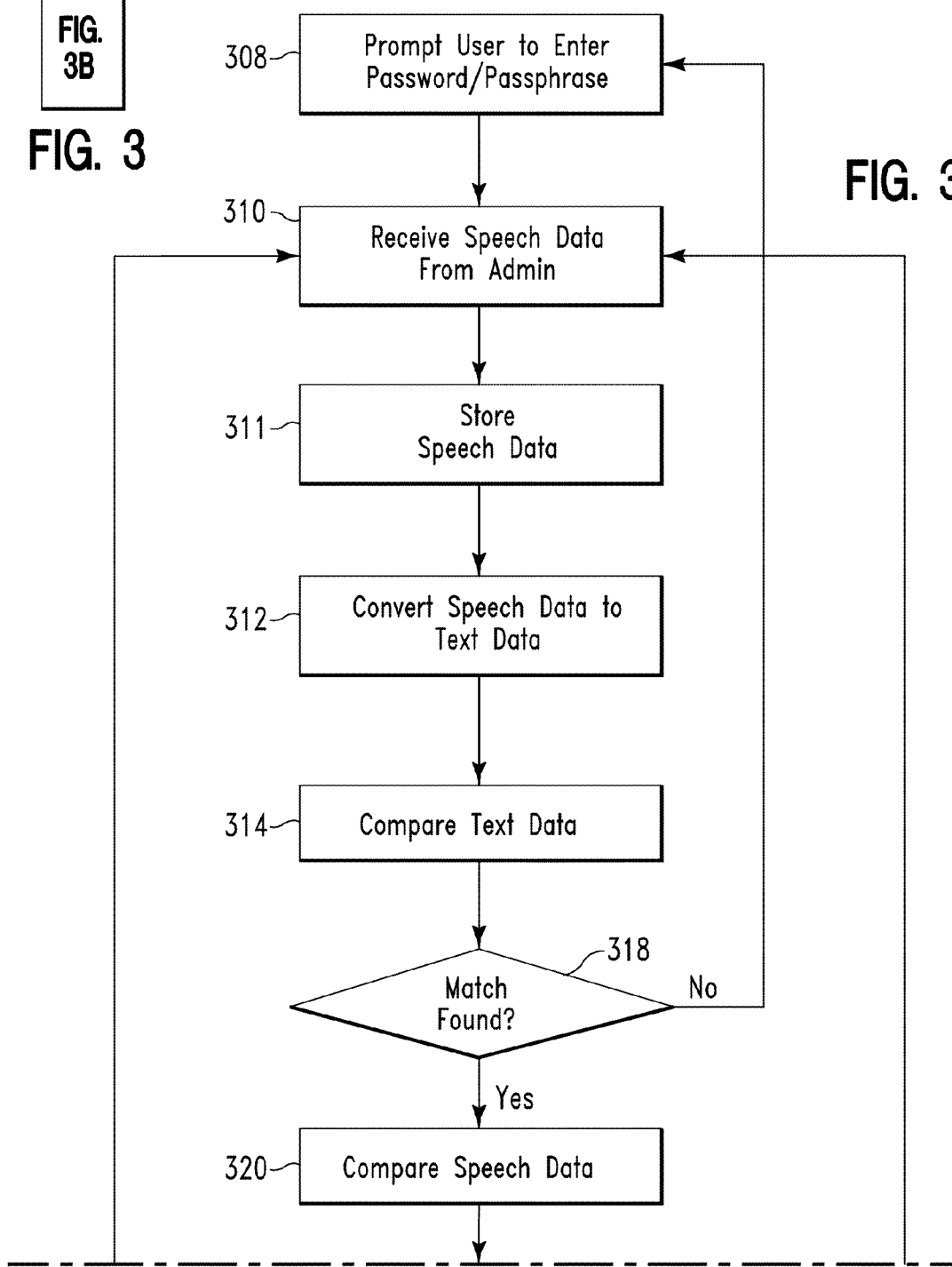

TELEPHONE VOICE COMMAND ENABLED COMPUTER ADMINISTRATION METHOD AND SYSTEM

FIELD OF THE INVENTION

The present invention relates to a method and associated system for providing remote computer administration using voice commands.

BACKGROUND OF THE INVENTION

Maintaining systems typically comprises an inefficient process with little flexibility. Accordingly, there exists a need in the art to overcome at least some of the deficiencies and limitations described herein above.

SUMMARY OF THE INVENTION

The present invention provides an administration method comprising:

receiving, by a computing system, a first telephone call from an administrator;

authenticating, by said computing system, said administrator;

after said authenticating, presenting by said computing system to said administrator, an audible menu associated with a plurality of computers;

receiving, by said computing system from said administrator in response to said audible menu, first speech data comprising a first audible selection from said audible menu, wherein said first audible selection is associated a first computer of said plurality of computers;

initiating, by said computing system for said administrator in response to said first audible selection, a first remote terminal session with said first computer, wherein said first remote terminal session enables said administrator to issue audible verbal commands for performing maintenance operations on said first computer;

transmitting, by computing system to said administrator, a first audible verbal message indicating said initiating said first remote terminal session;

receiving, by computing system from said administrator in response to said first audible verbal message, second speech data comprising a first audible verbal command for performing a first maintenance operation on said first computer;

executing, by said computing system, in response to said first audible verbal command, said first maintenance operation on said first computer;

receiving, by said computing system from said first computer, first confirmation data indicating that said first maintenance operation has been completed;

converting, by said computing system, said first confirmation data into third speech data comprising a second audible verbal message; and transmitting, by said computing system to said administrator, said second audible verbal message.

The present invention provides a computing system comprising a processor coupled to a computer-readable memory unit, said memory unit comprising a resource server software application and instructions that when executed by the processor implements an administration method, said method comprising:

receiving, by said computing system, a first telephone call from an administrator;

authenticating, by said computing system, said administrator;

after said authenticating, presenting by said computing system to said administrator, an audible menu associated with a plurality of computers;

receiving, by said computing system from said administrator in response to said audible menu, first speech data comprising a first audible selection from said audible menu, wherein said first audible selection is associated a first computer of said plurality of computers;

initiating, by said computing system for said administrator in response to said first audible selection, a first remote terminal session with said first computer, wherein said first remote terminal session enables said administrator to issue audible verbal commands for performing maintenance operations on said first computer;

transmitting, by computing system to said administrator, a first audible verbal message indicating said initiating said first remote terminal session;

receiving, by computing system from said administrator in response to said first audible verbal message, second speech data comprising a first audible verbal command for performing a first maintenance operation on said first computer;

executing, by said computing system, in response to said first audible verbal command, said first maintenance operation on said first computer;

receiving, by said computing system from said first computer, first confirmation data indicating that said first maintenance operation has been completed;

converting, by said computing system, said first confirmation data into third speech data comprising a second audible verbal message; and transmitting, by said computing system to said administrator, said second audible verbal message.

The present invention provides a computer program product, comprising a computer usable medium comprising a computer readable program code embodied therein, said computer readable program code adapted to implement an administration method within a computing system, said method comprising:

receiving, by said computing system, a first telephone call from an administrator;

authenticating, by said computing system, said administrator;

after said authenticating, presenting by said computing system to said administrator, an audible menu associated with a plurality of computers;

receiving, by said computing system from said administrator in response to said audible menu, first speech data comprising a first audible selection from said audible menu, wherein said first audible selection is associated a first computer of said plurality of computers;

initiating, by said computing system for said administrator in response to said first audible selection, a first remote terminal session with said first computer, wherein said first remote terminal session enables said administrator to issue audible verbal commands for performing maintenance operations on said first computer;

transmitting, by computing system to said administrator, a first audible verbal message indicating said initiating said first remote terminal session;

receiving, by computing system from said administrator in response to said first audible verbal message, second speech data comprising a first audible verbal command for performing a first maintenance operation on said first computer;

executing, by said computing system, in response to said first audible verbal command, said first maintenance operation on said first computer;

receiving, by said computing system from said first computer, first confirmation data indicating that said first maintenance operation has been completed;

converting, by said computing system, said first confirmation data into third speech data comprising a second audible verbal message; and transmitting, by said computing system to said administrator, said second audible verbal message.

The present invention advantageously provides a simple method and associated system capable of maintaining systems.

BRIEF DESCRIPTION OF THE DRAWINGS

FIG. 3 which includes FIGS. 3A and 3B illustrates a flowchart detailing an authentication step of FIG. 2, in accordance with embodiments of the present invention.

DETAILED DESCRIPTION OF THE INVENTION

Figure 1:
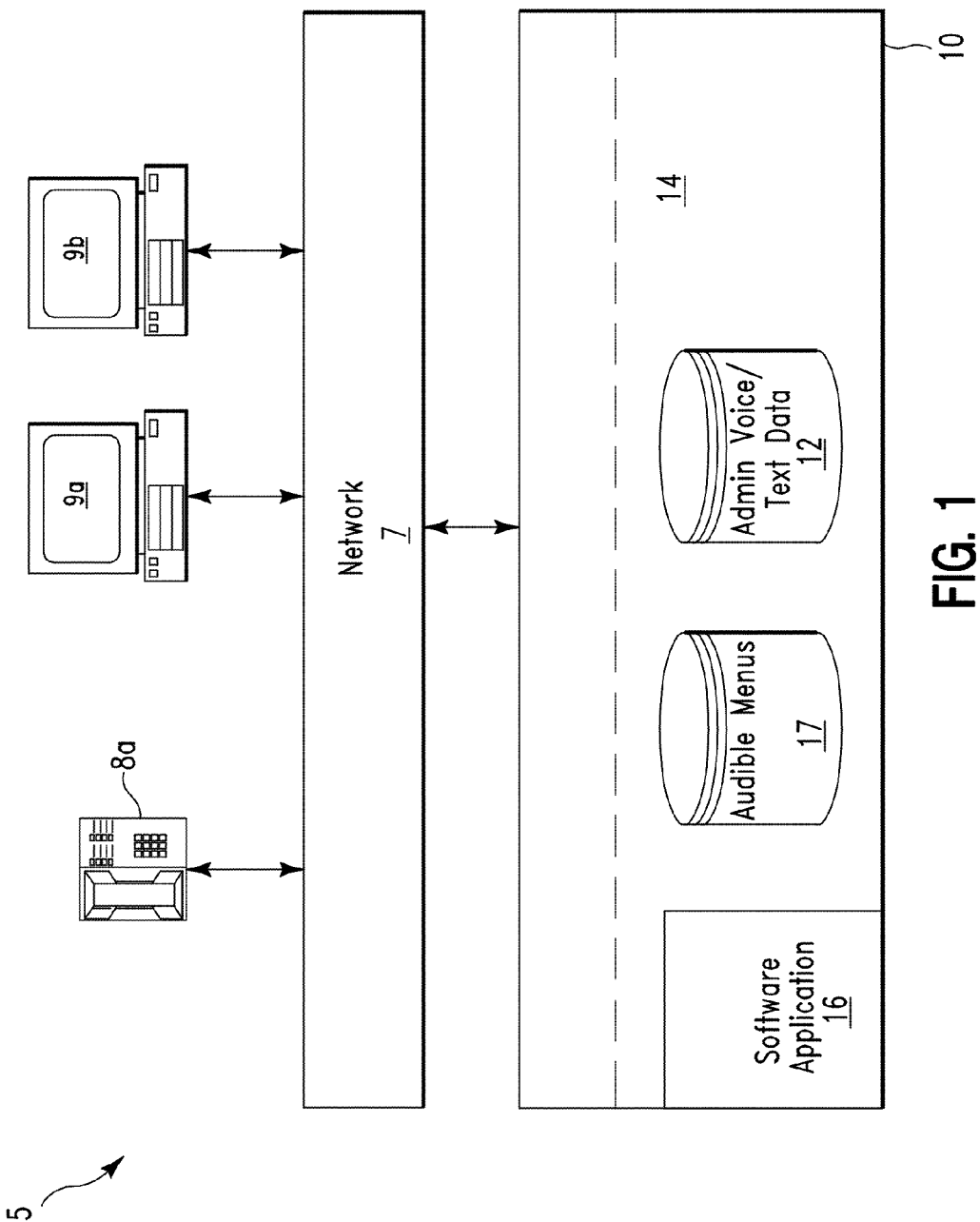
FIG. 1 illustrates a system for allowing an administrator to issue remote voice commands for performing maintenance operations on a computing apparatus(s), in accordance with embodiments of the present invention.

FIG. 1 illustrates a system 5 for allowing an administrator to issue remote voice commands for performing maintenance operations on computing apparatus 9a and 9b, in accordance with embodiments of the present invention. An administrator may comprise any party authorized to perform maintenance operations. Maintenance operations may include any type of maintenance operations associated with computers including, inter alia, software/firmware updates, receiving performance data (e.g., CPU utilization, etc), performing restart functions, etc. Maintenance operations may include any type of menu utility functions associated with computers including, inter alia:

1. A syscon function—A syscon function allows an administrator to add and modify administrator accounts and groups, assign trustee rights (permissions) for resources, set login scripts, and manage a resource-use accounting system.
2. A filer function—A filer function allows an administrator to manage shared directories and files.
3. An fconsole function—An fconsole function allows an administrator to monitor the use of a server (e.g., identifying a party using the server), checking statistics on server performance, and shutting down a server if necessary.
4. A printdef function—A printdef function allows an administrator to define properties of printers on a network.
5. A printcon function—A printcon function allows an administrator to define print job configurations. Print job configurations comprise information about a printer and paper types to be used for a certain set of print jobs.
6. A pconsole function—A pconsole function allows an administrator to manage printers and printer queues on a server.

System 5 allows a voice activated media/telephony channel to be enabled for conducting computer (e.g., server) administration remotely. System 5 performs the following functions with respect to an administrator:
1. Perform an authentication process for an administrator.
2. Provide an audible menu system for the administrator.

The audible menu system allows an administrator to perform the following functions:
1. Identification of a server(s) on which a set of operations are to be performed.
2. Identification of an application on a specific server.
3. Perform system maintenance on the specific server.
4. Perform general server administration (e.g., restarts, downloads, updates, etc).

System 2 additionally allows an authentication process (i.e., for an administrator) comprising a speech recognition process to be performed. The speech recognition process comprises prompting an administrator to enter secure information (e.g., a password/passphrase, an identification ID) via speech. The speech data (e.g., password/passphrase) is stored (as is) and converted to text data via a speech recognition process. A speech recognition process converts spoken words into a machine readable input representing a content of the spoken words (e.g., a binary code). The text data is passed over to a business logic module that identifies and authenticates the administrator. If the administrator is authenticated, the process passes onto the biometric identification process.

The biometric identification process comprises storing a voice print (sample) for an administrator so that when the administrator requests authentication, the stored voice print is compared to the administrators voice (i.e., the incoming speech data) to determine a match. If a match is found, the administrator is authenticated and allowed access into system 5.

System 5 of FIG. 1 comprises a telephone 8, a computing apparatus 9a and a computing apparatus 9b connected to a computing system 10 through a network 7. Computing apparatus 9a and 9b may comprise, inter alia, a personal computer, a laptop computer, a computer terminal, a server computer, etc. Computing apparatus 9a and 9b may comprise a single computing apparatus or a plurality of computing apparatuses. Telephone 8 may comprise any type of telephone including, inter alia, a wired telephone, a cordless telephone, a cellular telephone, etc. Telephone 8 may be connected to computing system 10 through a standard telephone network (i.e., network 7 is a telephone network). Alternatively, telephone 8 may be connected to network 7 (and computing system 10) through a computer (e.g., using voice over IP). Telephone 8 is used by an administrator for authentication and issuing commands for performing maintenance functions on computing apparatus 9a and 9b. Network 7 may comprise any type of network including, inter alia, a local area network, (LAN), a wide area network (WAN), the Internet, a telephone network, etc. Computing system 10 may comprise any type of computing system(s) including, inter alia, a personal computer (PC), a server computer, a database computer, etc. Computing system 10 comprises a memory system 14. Memory system 14 may comprise a single memory system. Alternatively, memory system 14 may comprise a plurality of memory systems. Memory system 14 comprises a software application 18, administrator text/voice data repository 12, and an audible menus repository 17. Administrator text/voice data repository 12 may comprise a database. Audible menus repository 17 may comprise a database. Administrator text/voice data repository 12 comprises administrator speech (voice) data (e.g., an administrator pre-recorded voice sample) and administrator text data (e.g., a password/passphrase spoken by the administrator and converted to text using a speech recognition process).

Software application 18 may comprise a speech recognition module and a voice print (biometrics) authentication module. The speech recognition module converts administrator speech data (e.g., password/passphrase) into text data. The voice print authentication module compares a stored voice print (i.e., for an administrator) to the administrators voice (i.e., the incoming speech data) to determine a match or a partial match. Software application 16 performs the following steps with respect to an implementation example for allowing an administrator to issue audible verbal commands for performing maintenance functions on computing apparatus 9a and 9b:

1. An administrator is provided with a toll free number to call in to computing system 10. In this example, the administrator (on the road) would like to check central processing unit (CPU) utilization (for computing apparatus 9a) of a process DLLHOST and depending on its utilization, the administrator must restart computing apparatus 9a. In addition, the administrator also must restart a Web server.
2. The administrator calls in using the toll free number (i.e., via telephone 8).
3. Computing system 10 authenticates the administrator as described, infra.
4. Computing system 10 presents an audible menu (i.e., associated with computing apparatus 9a and 9b) to the administrator.
5. In response to the audible menu presented in step 4, the administrator selects to work with computing apparatus 9a.
6. Computing system 10 initiates a sequence of commands to computing apparatus 9a and initiates a remote terminal session.
7. Computing system 10 provides confirmation to the administrator that a logon process was successful.
8. The administrator requests performance data for DLLHOST.
9. Computing system 10 verbally (audibly) presents (i.e., to the administrator) current CPU utilization and informs that the number is updated every 15 seconds.
10. The administrator informs computing system 10 that he/she would like to work on computing apparatus 9a and provides a name for computing apparatus 9a (e.g., server 2) and steps 6 and 7 are repeated for computing apparatus 9b.
11. The administrator requests to restart computing apparatus 10.
12. Computing system 10 parses the command from step 11 and transmits a restart message to computing apparatus 9b. The administrator stays on the line and is informed of the status after the restart.
13. The administrator terminates the session and hangs up telephone 8.

Figure 2:
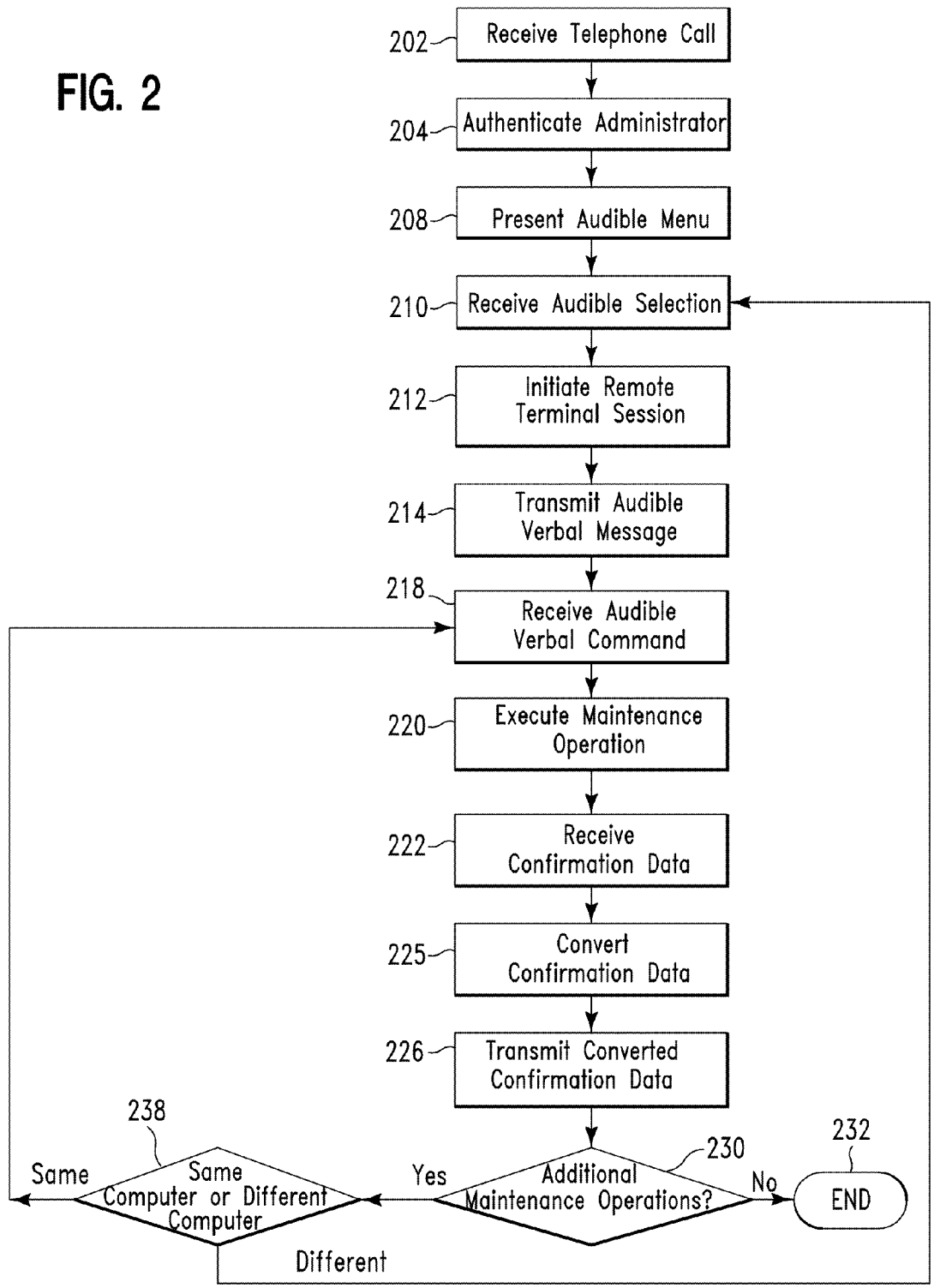
FIG. 2 illustrates a flowchart describing an algorithm used by the system of FIG. 1 for allowing an administrator to issue remote voice commands for performing maintenance operations on a computing apparatus, in accordance with embodiments of the present invention.

Software application 16 performs the following steps with respect to an implementation example for allowing authenticating the administrator:

1. Computing system 10 prompts the administrator to speak a secret pass phrase (e.g., the administrator says "A noise burst can destroy a frame").
2. The administrator says the secret pass phrase.
3. The secret pass phrase (i.e., speech data) is received by software application 16 (i.e., comprising a speech recognition module and a voice print (biometrics) authentication module).
4. The speech recognition module analyzes the text from the speech data spoken by the administrator to determine if the secret pass phrase matches a stored pass phrase.
   A. If the secret pass phrase matches the stored pass phrase, the speech recognition module flags the analysis as a success and notifies software application 16.
   B. If the secret pass phrase does not match the stored pass phrase (i.e., the phrase spoken was not the pass phrase), the speech recognition module flags the analysis as an error and notifies the software application 16. Software application 16 may then play back a message to the administrator asking them to repeat the pass phrase or take any further action as dictated by business rules.
5. The voice print (biometrics) authentication module analyzes the text from the speech data spoken by the administrator to determine if aural (i.e., audible) characteristics from the speech data match aural characteristics of a pre-established aural sample of the administrator.
   A. If the aural (i.e., audible) characteristics from the speech data match the aural characteristics of a pre-established aural sample of the administrator, the voice print (biometrics) authentication module flags the analysis as a success and notifies software application 16.
   B. If the aural (i.e., audible) characteristics from the speech data do not match the aural characteristics of a pre-established aural sample of the administrator, the voice print (biometrics) authentication module flags the analysis as an error and notifies software application 16. Additionally, the voice print (biometrics) authentication module may submit reasons for the error. For example, the spoken sample (i.e., the speech data) may not have a same frequency spectrum as the pre-established aural sample due to voice characteristics such as, inter alia, aging, sickness of the administrator, etc. In these cases, software application may request that the administrator submit further identification or re-sample the pass phrase.
6. Software application obtains both success flags (i.e., from the speech recognition module and the voice print (biometrics) authentication module) and logs the administrator into computing system 10. The administrator may then issue audible verbal commands for performing maintenance functions on computing apparatus 9a and 9b as describe, supra.:

FIG. 2 illustrates a flowchart describing an algorithm used by system 5 of FIG. 1 for allowing an administrator to issue remote voice commands for performing maintenance operations on a computing apparatus(s), in accordance with embodiments of the present invention. In step 202, a computing system (e.g., computing system 10 of FIG. 1) receives a telephone call (via a telephone such as telephone 8 of FIG. 1) from an administrator. In step 204, the computing system authenticates the administrator as described, infra with respect to FIG. 3. In step 208 (i.e., after the administrator has been authenticated), the computing system presents (i.e., via the telephone) an audible menu associated with computer apparatuses (e.g., computing apparatus 9a and 9b) to the administrator. In step 210, computing system receives (i.e., from the administrator via the telephone in response to the audible menu presented in step 208), speech data comprising an audible selection from the audible menu. The audible selection is associated with a specified computing apparatus (e.g., computing apparatus 9a or 9b). In step 212, the computing system initiates (i.e., for the administrator in response to the audible selection from step 210) a remote terminal session with the specified computing apparatus selected in step 210. The remote terminal session enables the administrator to issue audible verbal commands (i.e., via the telephone) for performing maintenance operations on the specified computing apparatus. In step 214, the computing system transmits (i.e., to the administrator via the telephone) an audible verbal message indicating the remote terminal session has been enabled. In step 218, the computing system receives (i.e., from the administrator via the telephone in response to the audible verbal message transmitted in step 214) speech data comprising an audible verbal command for performing a maintenance operation on the specified computing apparatus. In step 220, the computing system executes (i.e., in response to the audible verbal command of step 218) the maintenance operation (selected in step 218) on the specified computing apparatus. In step 222, the computing system receives from the computing apparatus, confirmation data indicating that the maintenance operation (selected in step 218) has been completed. In step 225, the computing system converts the confirmation data into speech data comprising an audible verbal message. In step 226, the computing system transmits (to said administrator) the audible verbal message generated in step 225. In step 230, it is determined if the administrator would like to perform additional maintenance operations.

If in step 230, it is determined that the administrator would not like to perform additional maintenance operations then the process is terminated in step 232.

If in step 230, it is determined that the administrator would like to perform additional maintenance operations then in step 238 it is determined if the additional maintenance operations will be performed on a same computing apparatus (e.g., computing apparatus 9a) or a different computing apparatus (e.g., computing apparatus 9b).

If in step 238 it is determined that the additional maintenance operations will be performed on a same computing apparatus (e.g., computing apparatus 9a) then step 218 is repeated (i.e., to issue an audible verbal command for performing a new maintenance operation on the (same) specified computing apparatus).

If in step 238 it is determined that the additional maintenance operations will be performed on a different computing apparatus (e.g., computing apparatus 9b) then step 210 is repeated (i.e., to issue an audible selection for a different specified computing apparatus).

Figure 3B:
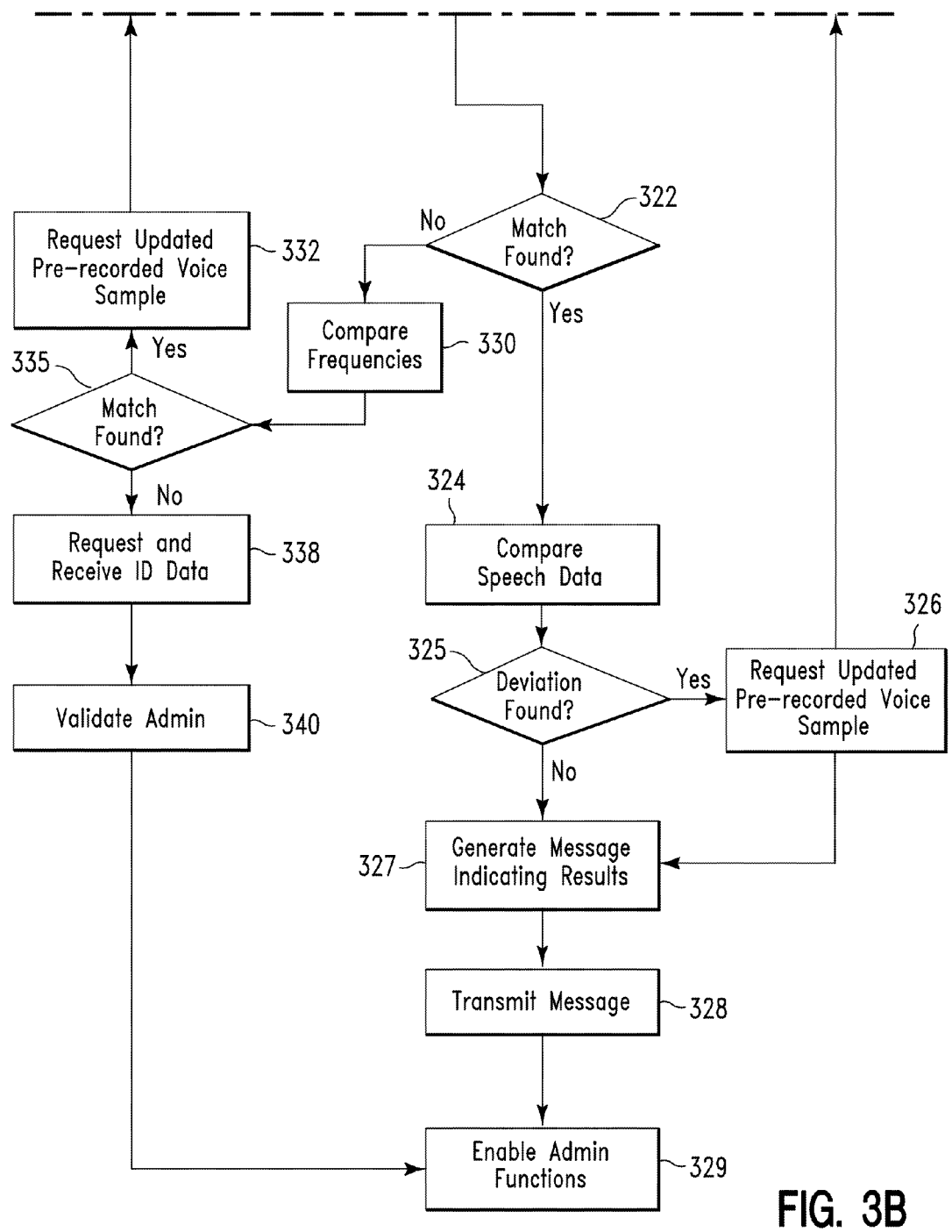

FIG. 3 which includes FIGS. 3A and 3B illustrates a flowchart detailing step 204 of FIG. 2, in accordance with embodiments of the present invention. In step 308, a computing system prompts an administrator to enter (i.e., via speech) a password/passphrase. In step 310, the computing system receives (i.e., from the administrator in response to step 308) speech data comprising an administrator password/passphrase associated with the administrator. The computing system comprises (i.e., stored in a memory system) existing text data associated with the administrator and a pre-recorded voice sample associated with the administrator. The existing text data comprises an existing password/passphrase. In step 311, the computing system stores the speech data. In step 312, the computing system converts the speech data to text data. In step 314, the computing system compares the text data to the existing text data (i.e., stored in the computing system). In step 318, it is determined (i.e., based on comparing the text data to the existing text data from step 314) if the administrator password/passphrase matches the existing password/passphrase. If in step 318, it is determined (i.e., based on comparing the text data to the existing text data from step 314) that the administrator password/passphrase does not match the existing password/passphrase then step 308 is repeated so that the administrator may be prompted to re-enter a password/passphrase. If in step 318, it is determined (i.e., based on comparing the text data to the existing text data from step 314) that the administrator password/passphrase does match the existing password/passphrase then in step 320, the computing system compares the speech data to the pre-recorded voice sample. In step 322, it is determined (i.e., based on comparing the speech data to the pre-recorded voice sample) if a first frequency spectrum associated with the speech data matches a second frequency spectrum associated with the pre-recorded voice sample.

If in step 322, it is determined (i.e., based on comparing the speech data to the pre-recorded voice sample) that the first frequency spectrum associated with the speech data matches the second frequency spectrum associated with the pre-recorded voice sample then in step 324, the computing system again compares the speech data to the pre-recorded voice sample. In step 325, it is determined (i.e., based on comparing the speech data to the pre-recorded voice sample) if a predetermined frequency deviation is found between the first frequency spectrum and the second frequency spectrum. The frequency deviation comprises a predetermined frequency difference (e.g., a maximum determined difference) between the first frequency spectrum and the second frequency spectrum. If in step 325, it is determined (i.e., based on comparing the speech data to the pre-recorded voice sample in step 324) that a predetermined frequency deviation is found between the first frequency spectrum and the second frequency spectrum then in step 326, the computing system requests that the administrator enter an updated pre-recorded voice sample and step 310 is repeated. Additionally in step 327, the computing system generates a message indicating results of steps 322 and 325. In step 328, the message is transmitted to the administrator. In step 329, administrator functions (e.g., access secure data, talk to an agent, etc) are enabled.

If in step 325, it is determined (i.e., based on comparing the speech data to the pre-recorded voice sample in step 324) that a predetermined frequency deviation is not found between the first frequency spectrum and the second frequency spectrum then in step 327, the computing system generates a message indicating results of steps 322 and 325. In step 328, the message is transmitted to the administrator. In step 329, administrator functions (e.g., access secure data, talk to an agent, etc) are enabled.

If in step 322, it is determined (i.e., based on comparing the speech data to the pre-recorded voice sample) that the first frequency spectrum associated with the speech data does not match the second frequency spectrum associated with the pre-recorded voice sample then in step 330, the computing system compares a first frequency of the first frequency spectrum to a second frequency of the second frequency spectrum. In step 335 it is determined (i.e., based on step 330) if the first frequency matches the second frequency.

If in step 335, it is determined (i.e., based on step 330) that the first frequency matches the second frequency then in step 332, the computing system requests that the administrator enter an updated pre-recorded voice sample and step 310 is repeated.

If in step 335, it is determined (i.e., based on step 330) that the first frequency does not match the second frequency then in step 338 then, the computing system may request that the administrator enter a administrator ID or password. Alternatively, an administrator of computing system may speak directly with the administrator in order to identify the administrator. In step 340 the computing system and/or the administrator validates or authenticates the administrator and step 328 executed as described, supra.

Figure 4:
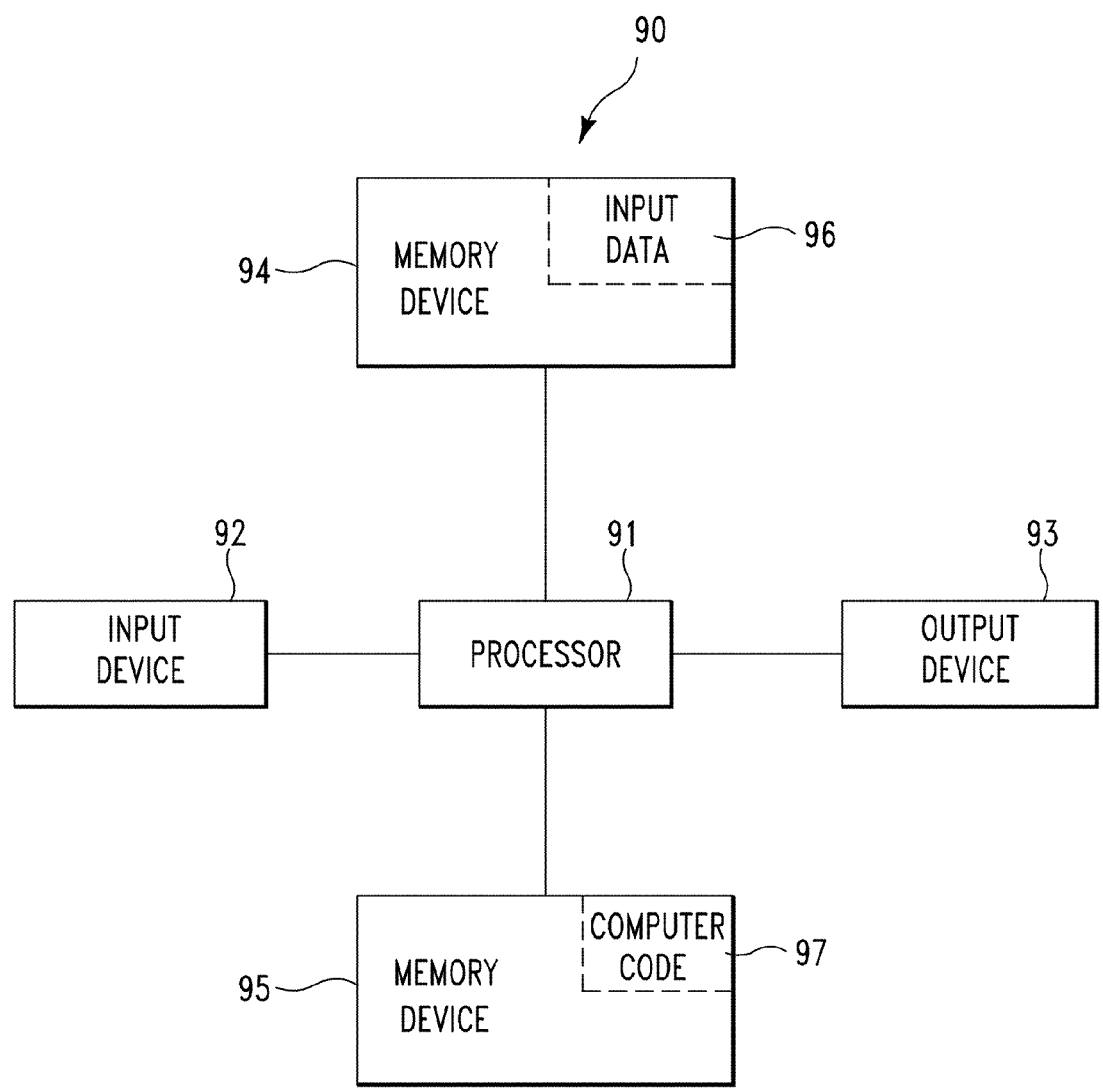
FIG. 4 illustrates a computer apparatus used for allowing an administrator to issue remote voice commands for performing maintenance operations on a computer, in accordance with embodiments of the present invention.

FIG. 4 illustrates a computer apparatus 90 (e.g., computing system 10 of FIG. 1) used for allowing an administrator to issue remote voice commands for performing maintenance operations on a computing apparatus, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIG. 2 and) allowing an administrator to issue remote voice commands for performing maintenance operations on a computing apparatus. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to allow an administrator to issue remote voice commands for performing maintenance operations on a computing apparatus. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for allowing an administrator to issue remote voice commands for performing maintenance operations on a computing apparatus. In another embodiment, the invention provides a business method that performs the process steps of the invention on a subscription, advertising, and/or fee basis. That is, a service provider, such as a Solution Integrator, could offer to allow an administrator to issue remote voice commands for performing maintenance operations on a computing apparatus. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An administration method comprising:
   receiving, by a computing system, a first telephone call from an administrator;
   authenticating, by said computing system, said administrator;
   after said authenticating, presenting by said computing system to said administrator, an audible menu associated with a plurality of computers;
   receiving, by said computing system from said administrator in response to said audible menu, first speech data comprising a first audible selection from said audible menu, wherein said first audible selection identifies a first computer of said plurality of computers and a specific software application on said first computer;
   initiating, by said computing system for said administrator in response to said first audible selection, a first remote terminal session with said first computer, wherein said first remote terminal session enables said administrator to issue audible verbal commands for performing maintenance operations on said first computer;
   transmitting, by said computing system to said administrator, a first audible verbal message indicating said initiating said first remote terminal session;
   receiving, by said computing system from said administrator in response to said first audible verbal message, second speech data comprising a first audible verbal command for performing a first maintenance operation on said first computer;
   executing, by said computing system, in response to said first audible verbal command, said first maintenance operation on said first computer;
   periodically transmitting, by said computing system to said administrator in response to said executing said first maintenance operation, additional audible verbal messages indicating periodic multiple updated CPU utilization of said first computer;
   modifying, by said computing system in response to said executing said first maintenance operation, trustee permissions for resources and login scripts for said first computer;
   performing, by said computing system in response to said executing said first maintenance operation, software/firmware updates for said first computer;
   performing, by said computing system in response to an additional verbal command from said administrator, a full restart of said first computer;
   receiving, by said computing system from said first computer, first confirmation data indicating that said first maintenance operation, said modifying, said software/firmware updates, and said full restart have been completed;
   converting, by said computing system, said first confirmation data into third speech data comprising a second audible verbal message; and
   transmitting, by said computing system to said administrator, said second audible verbal message.

2. The method of claim 1, further comprising:
   receiving, by said computing system from said administrator, a second audible verbal command for performing a second maintenance operation on said first computer, wherein said first maintenance operation differs from said second maintenance operation;

executing, by said computing system, in response to said second audible verbal command, said second maintenance operation on said first computer;

receiving, by said computing system from said first computer, second confirmation data indicating that said second maintenance operation has completed; and converting, by said computing system, said second confirmation data into fourth speech data comprising a third audible verbal message; and transmitting, by said computing system to said administrator, said third audible verbal message.

3. The method of claim 1, further comprising:

receiving, by said computing system from said administrator, fourth speech data comprising a second audible selection from said audible menu, wherein said second audible selection is associated a second computer of said plurality of computers;

disabling, by said computing system in response to said fourth speech data, said first remote terminal session with said first computer;

after said disabling, initiating by said computing system for said administrator, a second remote terminal session with said second computer, wherein said second remote terminal session enables said administrator to issue audible verbal commands for performing maintenance operations on said second computer;

transmitting, by computing system to said administrator, a third audible verbal message indicating said initiating said second remote terminal session;

receiving, by computing system from said administrator in response to said third audible message, fifth speech data comprising a second audible verbal command for performing a second maintenance operation on said second computer;

executing, by said computing system, in response to said second audible verbal command, said second maintenance operation on said second computer;

receiving, by said computing system from said first computer, second confirmation data indicating that said second maintenance operation has been completed;

converting, by said computing system, said second confirmation data into sixth speech data comprising a fourth audible verbal message; and transmitting, by said computing system to said administrator, said fourth audible verbal message.

4. The method of claim 3, wherein said first computer and said second computer are located on a same network.

5. The method of claim 3, wherein said second maintenance operation differs from said first maintenance operation.

6. The method of claim 1, wherein said first maintenance operation comprises an operation selected from the group consisting of a syscon operation, a filer operation, a fconsole operation, a printdef operation, a printcon operation, and a pconsole operation.

7. A computing system comprising a processor coupled to a computer-readable memory unit, said memory unit comprising a resource server software application and instructions that when executed by the processor implements an administration method, said method comprising:

receiving, by said computing system, a first telephone call from an administrator;

authenticating, by said computing system, said administrator;

after said authenticating, presenting by said computing system to said administrator, an audible menu associated with a plurality of computers;

receiving, by said computing system from said administrator in response to said audible menu, first speech data comprising a first audible selection from said audible menu, wherein said first audible selection identifies a first computer of said plurality of computers and a specific software application on said first computer;

initiating, by said computing system for said administrator in response to said first audible selection, a first remote terminal session with said first computer, wherein said first remote terminal session enables said administrator to issue audible verbal commands for performing maintenance operations on said first computer;

transmitting, by computing system to said administrator, a first audible verbal message indicating said initiating said first remote terminal session;

receiving, by computing system from said administrator in response to said first audible verbal message, second speech data comprising a first audible verbal command for performing a first maintenance operation on said first computer;

executing, by said computing system, in response to said first audible verbal command, said first maintenance operation on said first computer;

periodically transmitting, by said computing system to said administrator in response to said executing said first maintenance operation, additional audible verbal messages indicating periodic multiple updated CPU utilization of said first computer;

modifying, by said computing system in response to said executing said first maintenance operation, trustee permissions for resources and login scripts for said first computer;

performing, by said computing system in response to said executing said first maintenance operation, software/firmware updates for said first computer;

performing, by said computing system in response to an additional verbal command from said administrator, a full restart of said first computer;

receiving, by said computing system from said first computer, first confirmation data indicating that said first maintenance operation, said modifying, said software/firmware updates, and said full restart have been completed;

converting, by said computing system, said first confirmation data into third speech data comprising a second audible verbal message; and transmitting, by said computing system to said administrator, said second audible verbal message.

8. The computing system of claim 7, wherein said method further comprises:

receiving, by said computing system from said administrator, a second audible verbal command for performing a second maintenance operation on said first computer, wherein said first maintenance operation differs from said second maintenance operation;

executing, by said computing system, in response to said second audible verbal command, said second maintenance operation on said first computer;

receiving, by said computing system from said first computer, second confirmation data indicating that said second maintenance operation has completed; and converting, by said computing system, said second confirmation data into fourth speech data comprising a third audible verbal message; and transmitting, by said computing system to said administrator, said third audible verbal message.

9. The computing system of claim 7, wherein said method further comprises:
   receiving, by said computing system from said administrator, fourth speech data comprising a second audible selection from said audible menu, wherein said second audible selection is associated a second computer of said plurality of computers;
   disabling, by said computing system in response to said fourth speech data, said first remote terminal session with said first computer;
   after said disabling, initiating by said computing system for said administrator, a second remote terminal session with said second computer, wherein said second remote terminal session enables said administrator to issue audible verbal commands for performing maintenance operations on said second computer;
   transmitting, by computing system to said administrator, a third audible verbal message indicating said initiating said second remote terminal session;
   receiving, by computing system from said administrator in response to said third audible message, fifth speech data comprising a second audible verbal command for performing a second maintenance operation on said second computer;
   executing, by said computing system, in response to said second audible verbal command, said second maintenance operation on said second computer;
   receiving, by said computing system from said first computer, second confirmation data indicating that said second maintenance operation has been completed;
   converting, by said computing system, said second confirmation data into sixth speech data comprising a fourth audible verbal message; and
   transmitting, by said computing system to said administrator, said fourth audible verbal message.

10. The computing system of claim 9, wherein said first computer and said second computer are located on a same network.

11. The computing system of claim 9, wherein said second maintenance operation differs from said first maintenance operation.

12. The computing system of claim 7, wherein said first maintenance operation comprises an operation selected from the group consisting of a syscon operation, a filer operation, a fconsole operation, a printdef operation, a printcon operation, and a pconsole operation.

13. A computer readable storage device embodied with a computer program product including a computer readable program code executed by a computing system performing a method comprising:
   receiving, by said computing system, a first telephone call from an administrator;
   authenticating, by said computing system, said administrator;
   after said authenticating, presenting by said computing system to said administrator, an audible menu associated with a plurality of computers;
   receiving, by said computing system from said administrator in response to said audible menu, first speech data comprising a first audible selection from said audible menu, wherein said first audible selection identifies a first computer of said plurality of computers and a specific software application on said first computer;
   initiating, by said computing system for said administrator in response to said first audible selection, a first remote terminal session with said first computer, wherein said first remote terminal session enables said administrator to issue audible verbal commands for performing maintenance operations on said first computer;
   transmitting, by computing system to said administrator, a first audible verbal message indicating said initiating said first remote terminal session;
   receiving, by computing system from said administrator in response to said first audible verbal message, second speech data comprising a first audible verbal command for performing a first maintenance operation on said first computer;
   executing, by said computing system, in response to said first audible verbal command, said first maintenance operation on said first computer;
   periodically transmitting, by said computing system to said administrator in response to said executing said first maintenance operation, additional audible verbal messages indicating periodic multiple updated CPU utilization of said first computer;
   modifying, by said computing system in response to said executing said first maintenance operation, trustee permissions for resources and login scripts for said first computer;
   performing, by said computing system in response to said executing said first maintenance operation, software/firmware updates for said first computer;
   performing, by said computing system in response to an additional verbal command from said administrator, a full restart of said first computer;
   receiving, by said computing system from said first computer, first confirmation data indicating that said first maintenance operation, said modifying, said software/firmware updates, and said full restart have been completed;
   converting, by said computing system, said first confirmation data into third speech data comprising a second audible verbal message; and
   transmitting, by said computing system to said administrator, said second audible verbal message.

14. The computer program product of claim 13, wherein said method further comprises:
   receiving, by said computing system from said administrator, a second audible verbal command for performing a second maintenance operation on said first computer, wherein said first maintenance operation differs from said second maintenance operation;
   executing, by said computing system, in response to said second audible verbal command, said second maintenance operation on said first computer;
   receiving, by said computing system from said first computer, second confirmation data indicating that said second maintenance operation has completed; and
   converting, by said computing system, said second confirmation data into fourth speech data comprising a third audible verbal message; and
   transmitting, by said computing system to said administrator, said third audible verbal message.

15. The computer program product of claim 13, wherein said method further comprises:
   receiving, by said computing system from said administrator, fourth speech data comprising a second audible selection from said audible menu, wherein said second audible selection is associated a second computer of said plurality of computers;
   disabling, by said computing system in response to said fourth speech data, said first remote terminal session with said first computer;

after said disabling, initiating by said computing system for said administrator, a second remote terminal session with said second computer, wherein said second remote terminal session enables said administrator to issue audible verbal commands for performing maintenance operations on said second computer;

transmitting, by computing system to said administrator, a third audible verbal message indicating said initiating said second remote terminal session;

receiving, by computing system from said administrator in response to said third audible message, fifth speech data comprising a second audible verbal command for performing a second maintenance operation on said second computer;

executing, by said computing system, in response to said second audible verbal command, said second maintenance operation on said second computer;

receiving, by said computing system from said first computer, second confirmation data indicating that said second maintenance operation has been completed;

converting, by said computing system, said second confirmation data into sixth speech data comprising a fourth audible verbal message; and transmitting, by said computing system to said administrator, said fourth audible verbal message.

16. The computer program product of claim 15, wherein said first computer and said second computer are located on a same network.

17. The computer program product of claim 15, wherein said second maintenance operation differs from said first maintenance operation.

18. The computer program product of claim 13, wherein said first maintenance operation comprises an operation selected from the group consisting of a syscon operation, a filer operation, a fconsole operation, a printdef operation, a printcon operation, and a pconsole operation.

\* \* \* \* \*